(12) United States Patent
Iten et al.

(10) Patent No.: US 9,332,317 B1
(45) Date of Patent: May 3, 2016

(54) METHOD AND APPARATUS TO SEARCH FOR PROGRAM CONTENT VIA A REMOTE CONTROL INTERFACE

(75) Inventors: Tommi J. Iten, Redondo Beach, CA (US); Eric J. Bennett, Los Angeles, CA (US); Christopher R. Roy, Los Angeles, CA (US); David P. Green, Castaic, CA (US); Kenny C. Chen, Fountain Valley, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 628 days.

(21) Appl. No.: 12/795,523

(22) Filed: Jun. 7, 2010

Related U.S. Application Data

(60) Provisional application No. 61/185,075, filed on Jun. 8, 2009.

(51) Int. Cl.
| | |
|---|---|
| *G06F 3/00* | (2006.01) |
| *G06F 13/00* | (2006.01) |
| *H04N 5/445* | (2011.01) |
| *H04N 21/482* | (2011.01) |
| *H04N 21/472* | (2011.01) |
| *G06F 17/30* | (2006.01) |

(52) U.S. Cl.
CPC ...... *H04N 21/4828* (2013.01); *G06F 17/30846* (2013.01); *H04N 21/472* (2013.01)

(58) Field of Classification Search
CPC ............. H04N 21/472; H04N 21/4828; G06F 17/30846
USPC ................... 725/39, 44–47, 53, 57; 348/732; 707/732, 999.003
See application file for complete search history.

(56) References Cited

U.S. PATENT DOCUMENTS

| | | | | |
|---|---|---|---|---|
| 5,986,650 | A * | 11/1999 | Ellis et al. | 725/40 |
| 6,002,394 | A * | 12/1999 | Schein et al. | 725/39 |
| 6,766,526 | B1 * | 7/2004 | Ellis | 725/57 |
| 7,213,256 | B1 * | 5/2007 | Kikinis | 725/53 |
| 7,224,409 | B2 * | 5/2007 | Chin et al. | 348/732 |
| 7,885,963 | B2 * | 2/2011 | Sanders | 707/750 |
| 8,191,094 | B2 * | 5/2012 | Azera et al. | 725/53 |
| 2003/0014753 | A1 * | 1/2003 | Beach et al. | 725/53 |
| 2004/0078816 | A1 * | 4/2004 | Johnson | 725/52 |
| 2005/0229214 | A1 * | 10/2005 | Young et al. | 725/58 |
| 2006/0130098 | A1 * | 6/2006 | Rao et al. | 725/53 |
| 2007/0266406 | A1 * | 11/2007 | Aravamudan et al. | 725/57 |
| 2008/0282291 | A1 * | 11/2008 | Henty | 725/44 |

\* cited by examiner

*Primary Examiner* — Hunter B Lonsberry
*Assistant Examiner* — Patrick A Ryan
(74) *Attorney, Agent, or Firm* — Gates & Cooper LLP (57) ABSTRACT

Systems, methods, and articles of manufacture for searching available programs in a broadcast system. A system in accordance with one or more embodiments of the present invention comprises a transmitter, transmitting a plurality of video programs and a program guide, the program guide comprising information related to the plurality of video programs, a receiver for receiving the plurality of programs and the program guide from the transmitter, a monitor, coupled to the receiver, for displaying at least a selected one of the plurality of video programs and for selectively displaying the program guide, and a remote control, coupled to the receiver, wherein the receiver accepts at least one input from the remote control, compares the information in the program to the at least one input, and presents a search result of programs from the plurality of programs having a matching characteristic with the at least one input.

30 Claims, 10 Drawing Sheets

METHOD AND APPARATUS TO SEARCH FOR PROGRAM CONTENT VIA A REMOTE CONTROL INTERFACE

CROSS-REFERENCE TO RELATED APPLICATIONS

This application claims the benefit of 35 U.S.C. §119(e) of U.S. Application Ser. No. 61/185,075, filed on Jun. 8, 2009, by Tommi J. Iten, Eric J. Bennett, Christopher R. Roy, David P. Green and Kenny C. Chen, entitled "METHODS AND APPARATUS TO SEARCH FOR PROGRAM CONTENT VIA A REMOTE CONTROL INTERFACE (FAST FIND)," which application is incorporated by reference herein.

BACKGROUND OF THE INVENTION

1. Field of the Invention

The present invention relates generally to satellite video systems, and in particular, to a method, apparatus, and article of manufacture for searching for program content via a remote control interface.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

Figure 1:
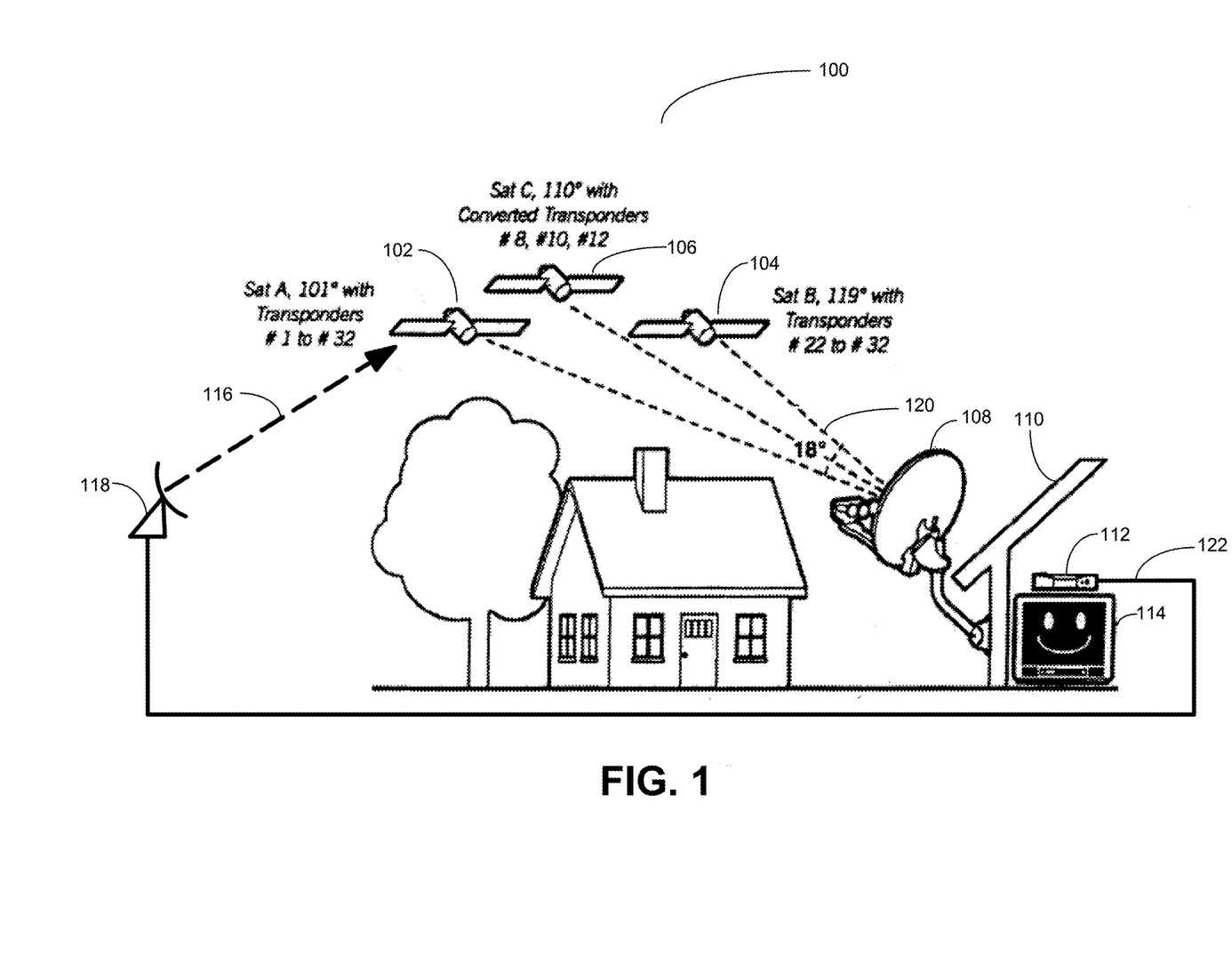
FIG. 1 illustrates a typical satellite television installation of the related art.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires, and to have a way to quickly find such programming.

SUMMARY OF THE INVENTION

To minimize the limitations in the prior art, and to minimize other limitations that will become apparent upon reading and understanding the present specification, the present invention comprises systems, methods, and articles of manufacture for searching available programs in a broadcast system. A system in accordance with one or more embodiments of the present invention comprises a transmitter, transmitting a plurality of video programs and a program guide, the program guide comprising information related to the plurality of video programs, a receiver for receiving the plurality of programs and the program guide from the transmitter, a monitor, coupled to the receiver, for displaying at least a selected one of the plurality of video programs and for selectively displaying the program guide, and a remote control, coupled to the receiver, wherein the receiver accepts at least one input from the remote control, compares the information in the program to the at least one input, and presents a search result of programs from the plurality of programs having a matching characteristic with the at least one input.

Such a system further optionally comprises the at least one input being a numerical input that has a characteristic of at least one alphabetic symbol, the receiver narrowing the search result as additional input from the remote control is accepted, the search result being presented in viewer channel, user-defined, or alphabetical order, the search result comprising at least one sub-list of results, video programs being currently broadcast, and the information comprising at least one of a television show name, a movie name, a producer name, and a person's name.

A method for searching available programs in a broadcast system, the broadcast system comprising a plurality of programs and a program guide including information related to the plurality of video programs, in accordance with one or more embodiments of the present invention comprises accepting at least one input from a remote control, comparing the information in the program guide to the at least one input, and presenting, on a monitor, a search result of programs from the plurality of programs having a matching characteristic with the at least one input. Such a method further optionally comprises the at least one input being a numerical input that has a characteristic of at least one alphabetic symbol, narrowing the search result as additional input from the remote control is accepted, the search result being presented in viewer channel, user-defined, or alphabetical order, the search result comprising at least one sub-list of results, video programs being currently broadcast, and the information comprising at least one of a television show name, a movie name, a producer name, and a person's name.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

User Remote Control Interface

Figure 2:
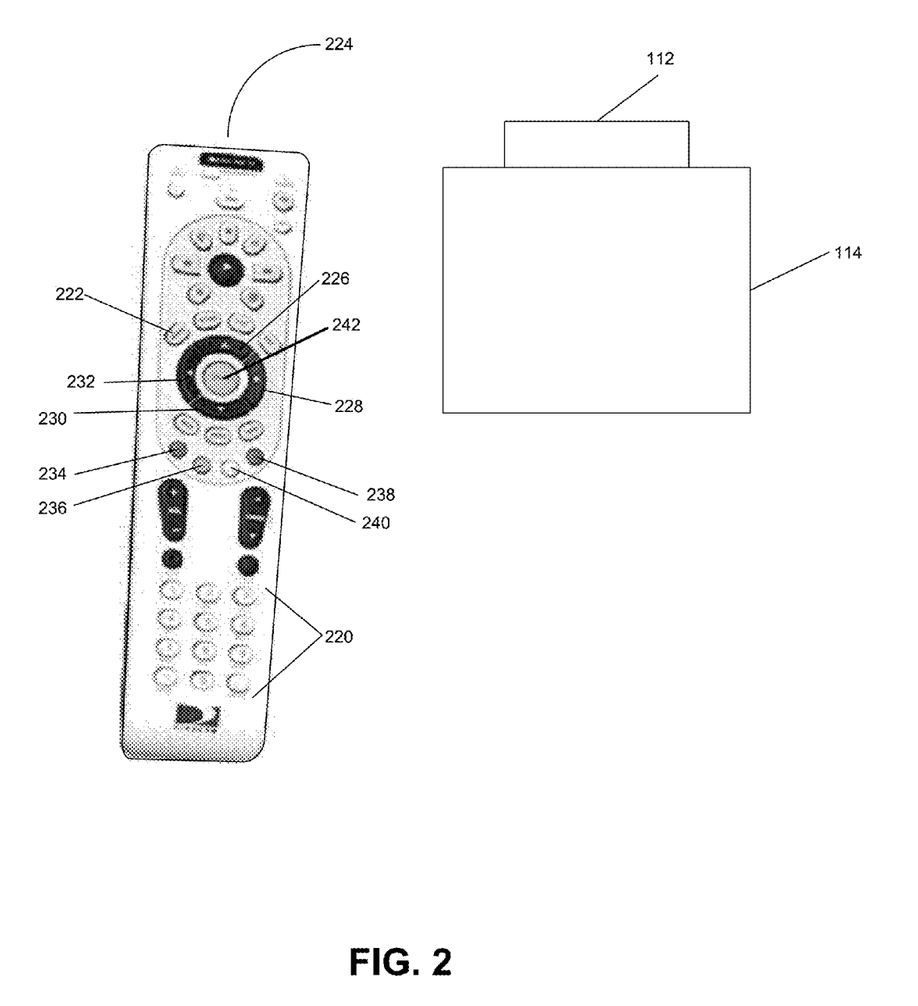
FIG. 2 illustrates a remote control used in the present invention.

FIG. 2 illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

Users can directly enter channel numbers via keypad 220, and access the Electronic Program Guide via button 222. The guide can then be navigated by cursor buttons 226-232, or other buttons on remote control 224 if desired, and other guide and/or channel functions can be navigated or displayed by buttons 234-240. To choose a specific channel from the guide or other feature selection, select button 242 is typically operated by the user of the remote control 224.

Viewer Interaction

Figure 3:
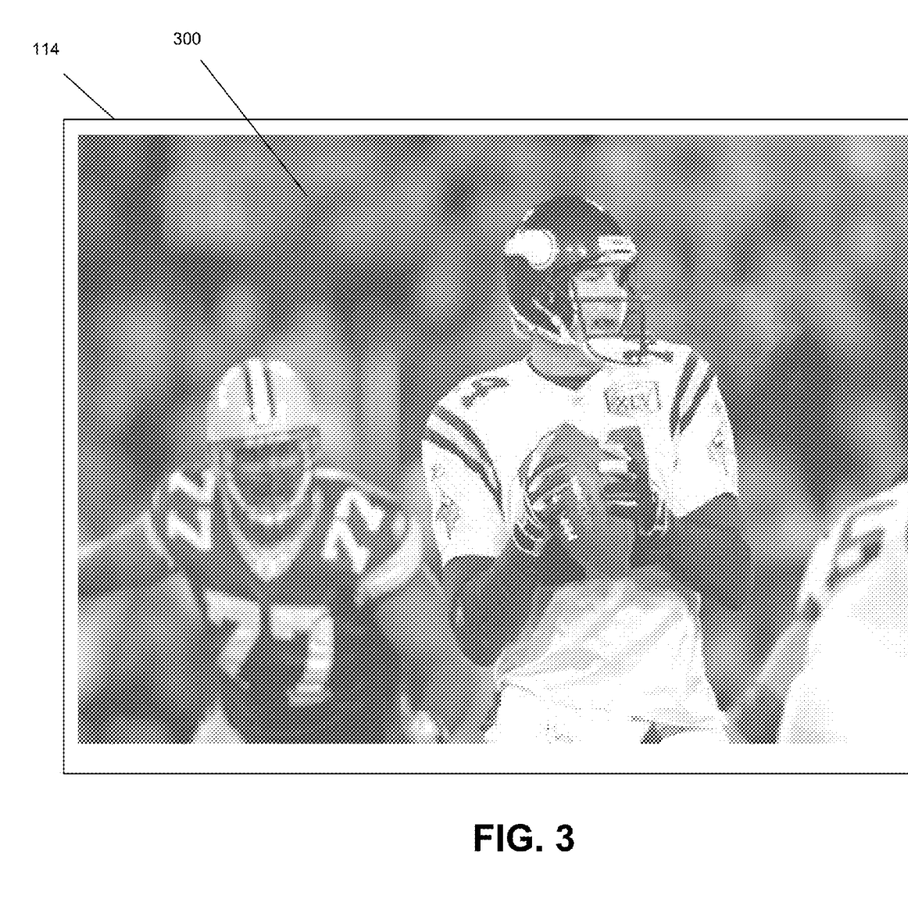
FIG. 3 illustrates an on-monitor display of a viewer channel in accordance with the present invention.

FIG. 3 illustrates an on-monitor display of a viewer channel in accordance with the present invention.

Video program 300 is shown as being displayed on monitor 114. Viewers use remote control 224 to change which video and/or audio information is being displayed on monitor 300. Typically, viewers will use guide button 222 to access the electronic program guide to investigate which other programs 300 are being broadcast, either at the present time or at some time in the future, to view a desired program 300, record program 300, or set a flag such that IRD 112 will automatically tune to desired program 300 at the proper time. Cursor keys 226-232 are typically used to navigate the guide in a linear fashion, e.g., by channel number. Alternatively, users can enter a channel number directly on keypad 220 to directly tune to a channel with program 300, if the user knows the channel number for the program 300 of interest.

Intelligent Guide Navigation

The present invention, also referred to herein as "Fast Find," allows for alternative ways of searching for programs being broadcast and received on IRD 112. Instead of putting in a mere channel number, which the IRD 112 interprets only as a channel number, when the user begins keying numbers on a TV remote control device as if to enter a direct channel number, IRD 112 searches the electronic program guide for programs 300 that match the input from keypad 220 in an alpha-numeric fashion, to reduce the amount of user interaction with the electronic program guide (EPG).

The EPG comprises hundreds of viewer channels and typically is loaded into the IRD 112 such that programs 300 that will be aired as far ahead as two weeks. Further, the present invention can search any database that is accessible via IRD 112, e.g., internet databases, other databases resident on or accessible from IRD 112, home networks that are coupled to IRD 112, etc., such that the search results would indicate where the indicated program is located and when, if ever, the indicated program will be shown. However, in a typical cursor 226-232 search strategy, several minutes would be required to locate channels, programs 300, etc. The present invention applies search techniques based on user input to reduce the EPG database to a more manageable size for user interaction, and removes several layers of user interface for a typical search query.

For example, the number 2 on the remote keypad 220, which prior to the present invention, would only be interpreted by IRD 112 as a "2," could be associated with the letters ABC, the number 3 with letters DEF, and so on, much like a telephone keypad. The matching data may come from the full set of data available for each program, and thus can include all current search types, including people associated with a program (actor, director, etc.), program titles, keywords, or channel names, bands, artists, albums, songs, pictures, or any other audio or video content displayed or accessible to IRD 112. As the user continues to enter numbers, the IRD 112 matches letters to the numbers, based upon available content.

So, for example, as the user enters a 2, all programs, actors, directors, or other EPG search fields having a first letter A, B or C, as well as every channel starting with the number 2, are displayed in a list. If the user subsequently enters a 3, the list is narrowed to programs with a first letter A, B or C, and a second letter D, E or F. Since many letter combinations are unlikely (such as BD or CF), the list shortens appreciably with each entry. If the user enters a third number, the list is further shortened. The user may enter as many additional numbers as is desired; the list begins populating with the first entry and is filtered and sorted as additional characters are entered, until either a single exact match is found, or a number/letter is entered that returns a null result. At any time that the user enters a group of digits for which there is not a matching channel number, the channel number is removed from the display, and only the list of matching program data is shown.

For example: Entering 4-2-6 might show channel number 426, with an associated search results list containing the Channel HBO (since 426 corresponds to the letters GHI, ABC and MNO), the movie "Game Show" (based on the match of GAM), and the actor Mark Hamill (based on the match of HAM). (It should be noted that results with numbers are included, such that pressing 4 returns all matches with G, H, I or 4.). Entering 4-2-6 thus searches all search fields for the appearance of the selected items, where the search field does not have to start with 4-2-6 (or HBO, or Ham, so long as the search term appears somewhere in the search field). So, for example, 4-2-6 could return channel 426, whichever channel HBO is airing on, Mark Hamill, and the movie "Shane" (where the letters H-A-N in "Shane" correspond to 4-2-6).

If there is no channel 426, then only the search results list is displayed. As each key is pressed, the letters corresponding to the match may be indicated in the search results. For example, in the above example, if the movie "Game Show" is displayed in the list, the letters "Gam" would be differentiated from the rest of the title. This might be done through color or font changes, such as displaying "Gam" in bold, or in a different color: "Gam". Alternately, the matching letters could be surrounded by a rectangle, a shaded background, or could be made to blink or do another optical affect. The purpose of this is that since each number may be used to enter any of several letters, there may be a need for a way to inform users of which letters are being matched to create a given set of search results.

Once the list of titles and people are displayed, the user may access the list using cursor keys 226-232, or other keys, on the remote control 224, and by highlighting or selecting an item on the list, could access additional information about the item or simply tune to the related programs being broadcast. In addition to programs being broadcast, the list could include programs currently on the hard drive, that could be played directly by pressing the PLAY key on the remote. It may also include on-demand programs that would be downloaded to the set-top box via an Internet or satellite connection or combination thereof.

Additional functionality can involve the use of submenus, such that selecting an item (e.g., Mark Hamill) would display the list of matching program results adjacent to the selection (Star Wars 4, American Graffiti, Star Wars 5, etc.), such that the user could access-that data via the remote directly, and tune to the associated program.

Additional buttons might be used to access additional associated data. For example, programs in the future associated with the selected item could be shown by pressing a designated remote key, and then selected for recording. Or pressing another designated key might display other episodes of the same series.

The Fast Find search strategy of the present invention may be presented in different implementations, depending upon the IRD 112 product or software release. Different implementations may also offer configurable settings, such that the user can access control over the presented search results. For example, the configuration for a particular IRD may default to return search results with the channel name first, program titles second and people third. The user may access a configuration screen that permits them to choose to display program title first, or people first. Or, they may choose to exclude channel names from the search results entirely. There may also be additional categories of search that are turned off by default; for example, categories. The user may be able to turn categories on, and thus by entering 7-7-6-7-8-7 (or some portion thereof) quickly see what sports programming is on. (7-7-6-7-8-7 corresponding to S-P-O-R-T-S).

Other examples of advantages of the present invention include a user wanting to watch a particular show at 8 pm, but doesn't remember the name or channel number it is on. With the present invention, the user can simply enter the name of the show on keypad 220 and choose the program from the resulting search results.

When a user wants to watch a show on the "Comedy Central" network, but can't remember which channel number "Comedy Central" is, current user interfaces would require the user to either search by channel, or browse the Guide row by row until "Comedy Central" is found. With the present invention, the user would simply press 2-6-6 on the keypad 220, and "Comedy Central" would be displayed as a choice along with any other channels that matched the numbers entered, below the current channel.

On-Screen Implementation

Figure 4:
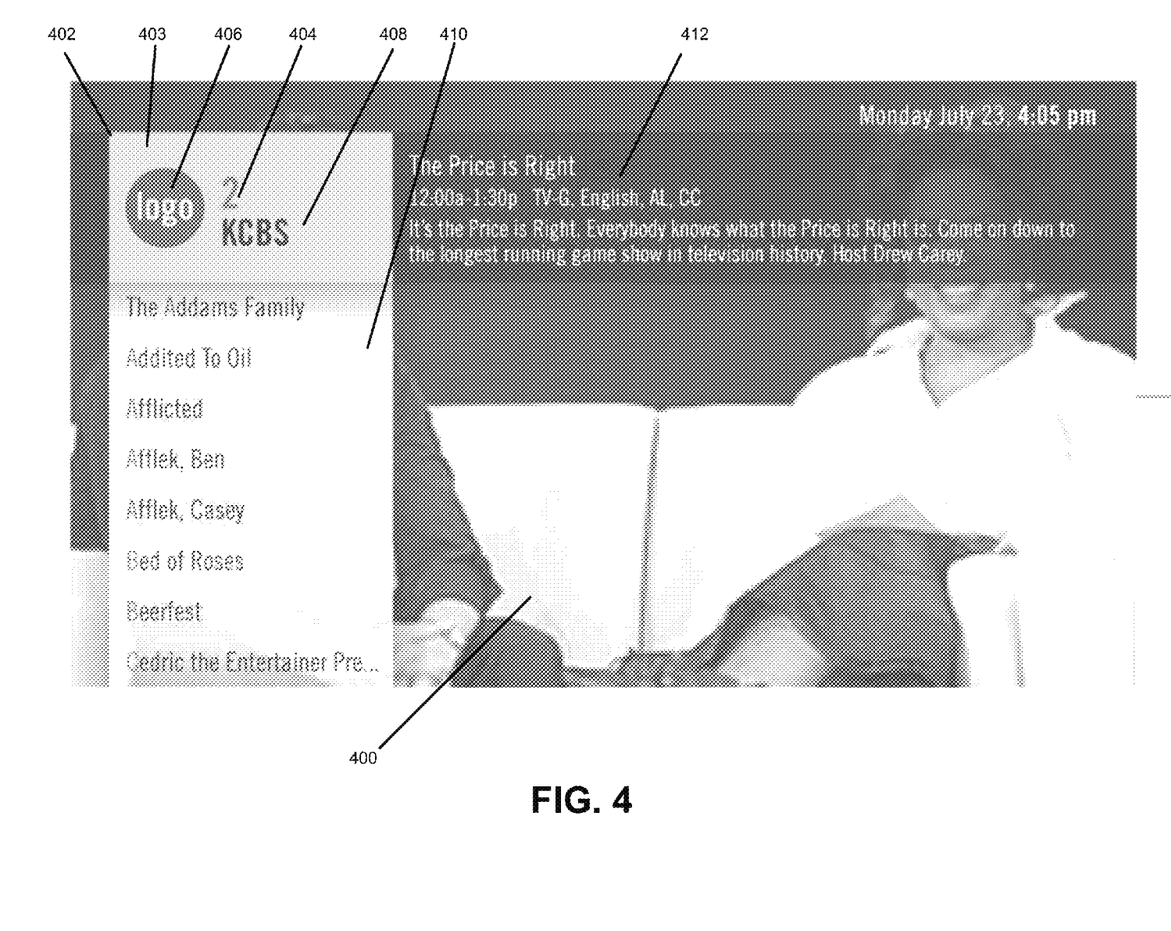
FIGS. 4-8 illustrate details of one or more embodiments of the present invention.

FIG. 4 illustrates an example of an embodiment of the present invention.

Program 400 is shown, and a user has pressed the "2" button on keypad 220, which brings up feature 402 on monitor 114. To indicate that user has pressed button "2" the feature 402 illustrates a main area 403 showing the user selection 404, along with any associated logo 406 and/or call letters 408 that may correspond to the user's selection 404. Further, feature 402 provides all other matches 410 below the main area 403 such the user can see other possible matches for selection 404. Text box 412 provides EPG data associated with the channel 404 displayed in main area 403.

If the user does nothing else, or presses a key, such as "Enter," on remote control 224, the IRD 112 will tune to channel 2. However, the user can now use other keys on remote control 224, such as cursor keys 226-232, to navigate additional matches 410.

For example, the feature 402 may also display all channels starting with the digit 2, such as all channels from 20-29, and from 200-299. The interface may also display program data that is selected based on an alphanumeric mapping to the digit 2, based on a familiar telephone keypad allocations; i.e., 2=ABC, 3=DEF, etc. Entering subsequent digits from remote control 224 beyond the first entry narrows the list of available matches 410 through application of a "sieve" algorithm, such that each additional entry reduces the number of matching results 410 that are found in the EPG, causing the list of matches 410 to become shorter. Alternately, the keypad 220 can respond in a "triple tap" mode, such that pressing the 2 key once displays "2," pressing it again displays "A," again, "B," etc. This mode may require the use of a time delay or entry key to allow successive entry of the characters on the same key.

The returned search results 410 (also referred to as "program data" or "search data" can include channel names, program titles, actors, directors and other people associated with the program title, program description keywords, and categories. Additional result types and subtypes may be defined by the service provider as desired.

The user may then use keys on the remote control 224, e.g., cursor keys 226-232, to scroll through the matches 410 and select a program to view or record, e.g., by tuning to the channel on which the selected program is broadcast.

This feature 402 may be additionally configured by the service provider (i.e., DIRECTV) or the user, to sort or filter the search data matches 410 that are returned. For example, the interface 402 may present only numeric matches 410 that exactly match the entered digits (so entering a "2" only returns channel 2, and not the other channels described above). The interface 402 may return all program titles that match at the top of the results, but only return people that match below those items, and keywords below those, or, alternatively, until the number of results has dropped below a predetermined threshold. Additionally some search data 410 may not be displayed until a certain number of characters have been entered. For example, keyword matches 410 may not be displayed until a certain number of characters have been entered. This last example may be chosen to reduce the number of search results that must be fetched from the program data and/or displayed for any given entry. The initial returned results 410 could be affected by time criteria, such that, for example, all results returned are associated with programs that are currently airing. Alternatively, all results 410 returned could be associated with programs that are "coming up" or about to air within a predetermined time slot (such as the next even half-hour or hour interval). Additionally, additional remote buttons may be used to change ("scroll forward") the viewable time slot, such that, for example, if the initial search results 410 are associated with programs that are currently airing (at, for example, 7:09 pm), pressing a remote key (such as the RIGHT arrow 228, for example) would permit the user to view the matching programs 410 in the next time slot.

Additional functionality may be assigned to other remote buttons when the Fast Search results are displayed. This functionality may or may not be displayed ("hinted") at onscreen. For example, when a program title is highlighted, pressing a remote key (for example, the "GREEN" key 238) could display upcoming re-broadcasts of the same show, including those on channels other than the currently airing version.

When the user enters numbers, if at any point the numeric entry would exclude all available associated channel numbers from matches 410, then the channel numbers are removed from the search display 410. For example, if the system supports channels 2 through 1005, and the user enters 3482, then no channel number is displayed as a search result 410 and the user interface displays only text-based search results 410.

The "1" and "0" keys on keypad 220, which are normally not associated with letters in telephone-keypad-type text entry, may substitute for other characters (such as common punctuation) during the search entry mode. At any time, if the user enters characters that result in a null search result set, the associated display area 410 stops updating or filtering. The service provider may configure whether the search results 410 become empty (a null set) at that point, or whether they continue to display the last valid results in area 410, with or without an indicator that new results are not available.

Search results 410 may include programs from different sources, including programs currently broadcasting via satellite, programs recorded to the receiver's hard drive, and "on-demand" programs available for download via the set-top box. Additionally, for IRDs 112 with antennas for receiving off-air broadcasts, the search results 410 may include programs available via terrestrial broadcast antenna, when data is available.

The search results 410 included by default may be fixed by the service provider, or they may be configurable, either by the service provider or end-user. In the latter case, a system setup screen can be used to select the type and order of search results that would be displayed. For example, some users may want to see channel names at the top of the list 410 while others would want to see program titles first. Some users may want to exclude keywords from results displayed in area 410, and some may want to exclude people. Alternately, the service provider may fix some aspect of the search results 410, but allow end-users to configure other aspects. For example, the display of channel names may be fixed at the top of the list 410, but the system may allow users to choose what items are displayed next in area 410 and in which order.

Figure 5:
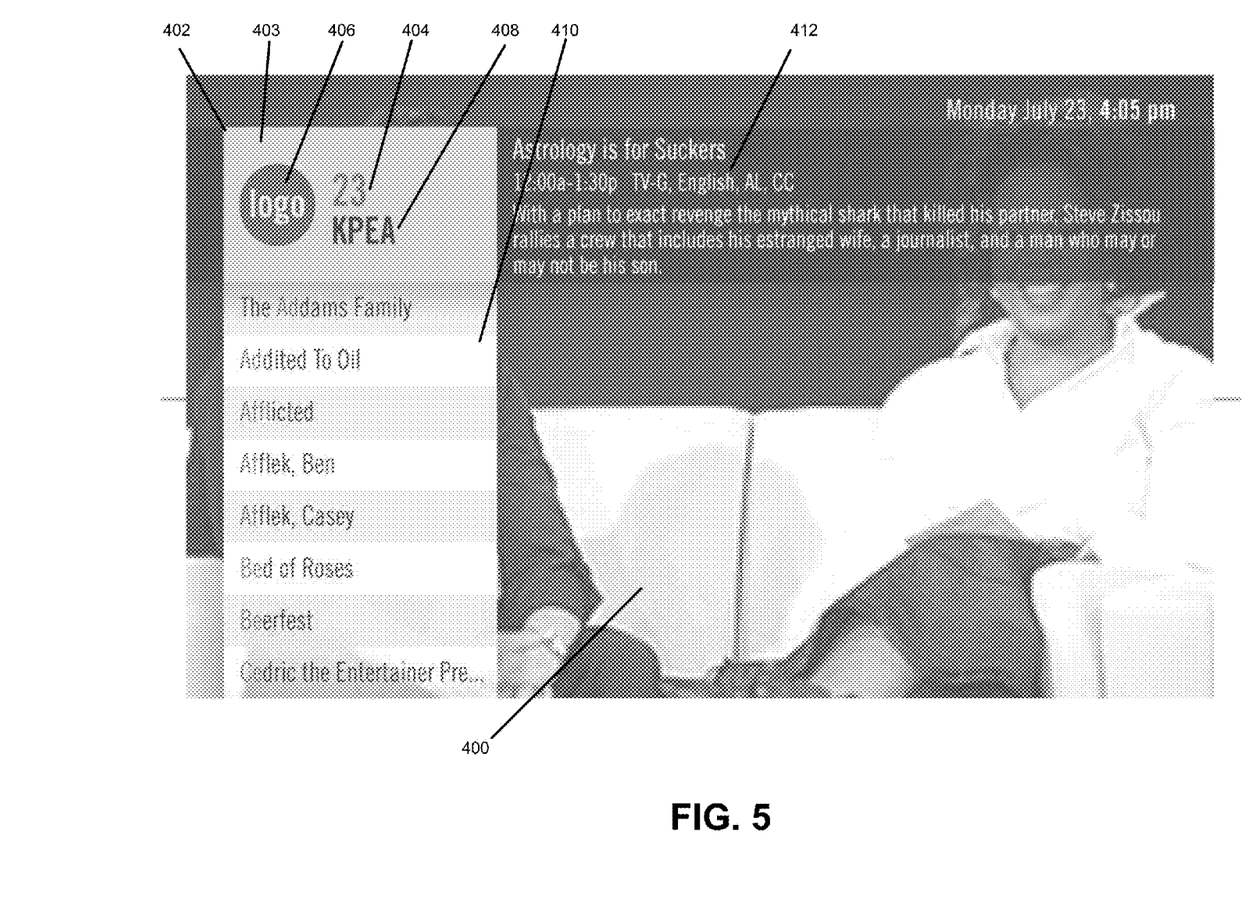

In FIG. 5, the user has entered a "3" via keypad 220, which results in updating main area 403 with the new user selection 404, guide data 412, call letters 408, and, search results 410. Thus, main area now displays channel 23, and a list 410 that has been narrowed down to matches for "ABC" with the next character "DEF."

Figure 6:
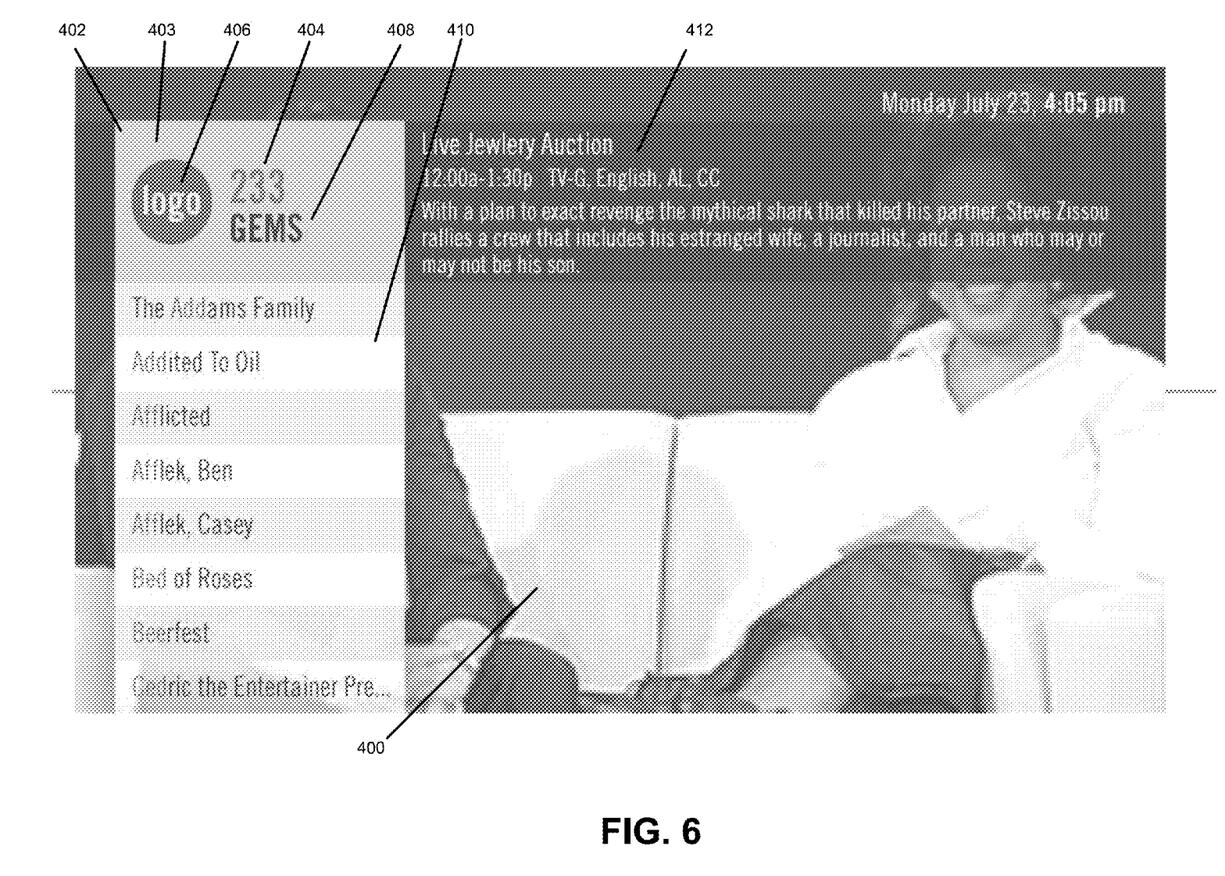

In FIG. 6, the user has entered another "3" via keypad 220, which results in a further update of main area 403 with the new user selection 404, guide data 412, call letters 408, and, search results 410. Thus, main area now displays channel 23, and a list 410 that has been narrowed down to matches for "ABC" with the next two characters matching "DEF." The matching results 410 are atypical in this case, in that the displayed matches 410 have not changed based on additional keypad 220 entries; however, the present invention encompasses changes in the matches 410 based on each entry of data from remote control 224.

Figure 7:
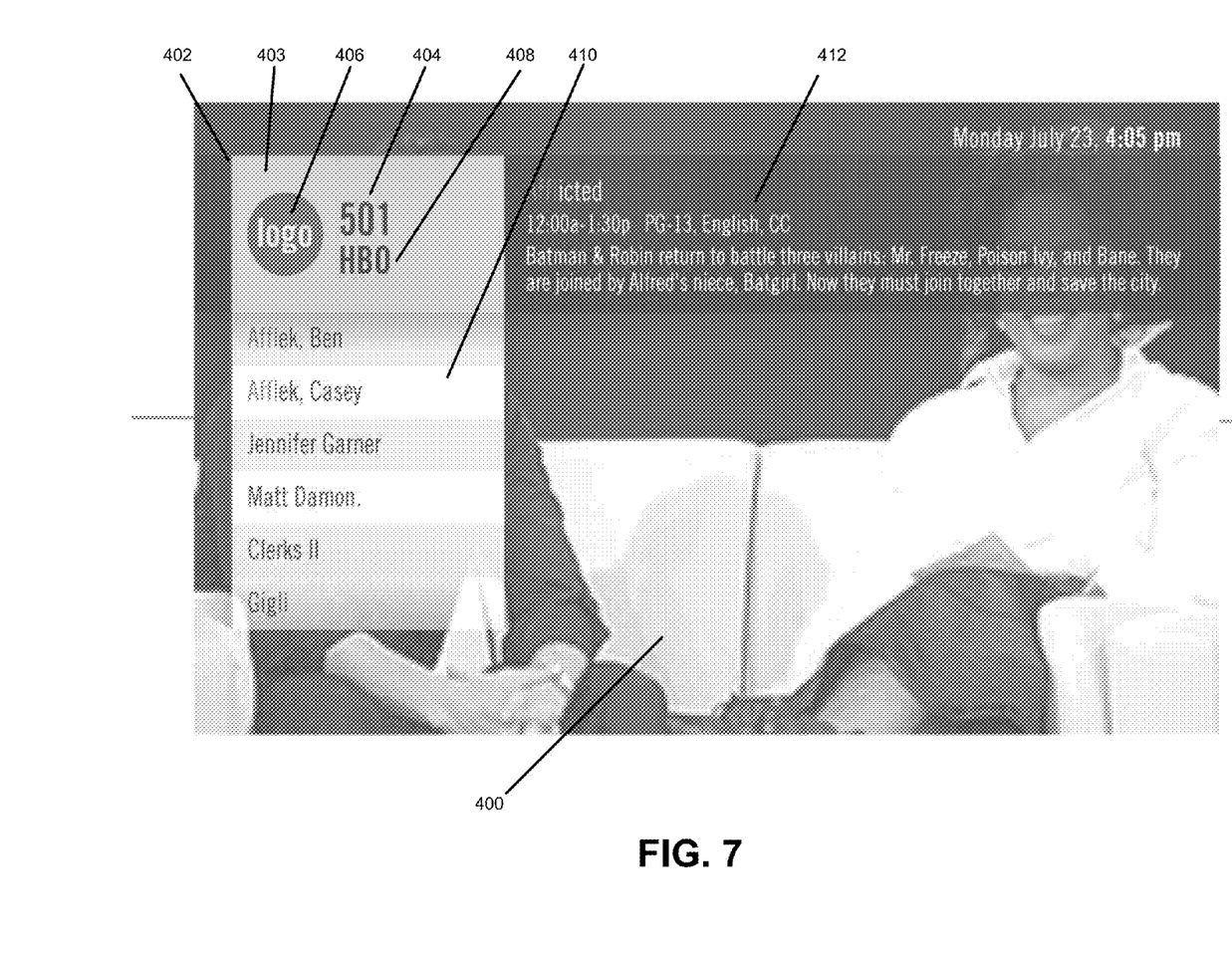

In FIG. 7, the user has entered a fourth digit, the number "5," from keypad 220. Since system 100 does not contain a channel 2335, the first matching text entry, "Afflicted," has scrolled into the channel user selection 404 (because Afflicted is being shown on channel 501), and the matching call letters, guide data, and other information for "Afflicted" has also been displayed in call letters 408, guide data 412, and main area 403 respectively. The highlighted letters "Affl" shown in guide data 412 and in list 410 indicate the match for what the user has keyed in via remote control 224.

Figure 8:
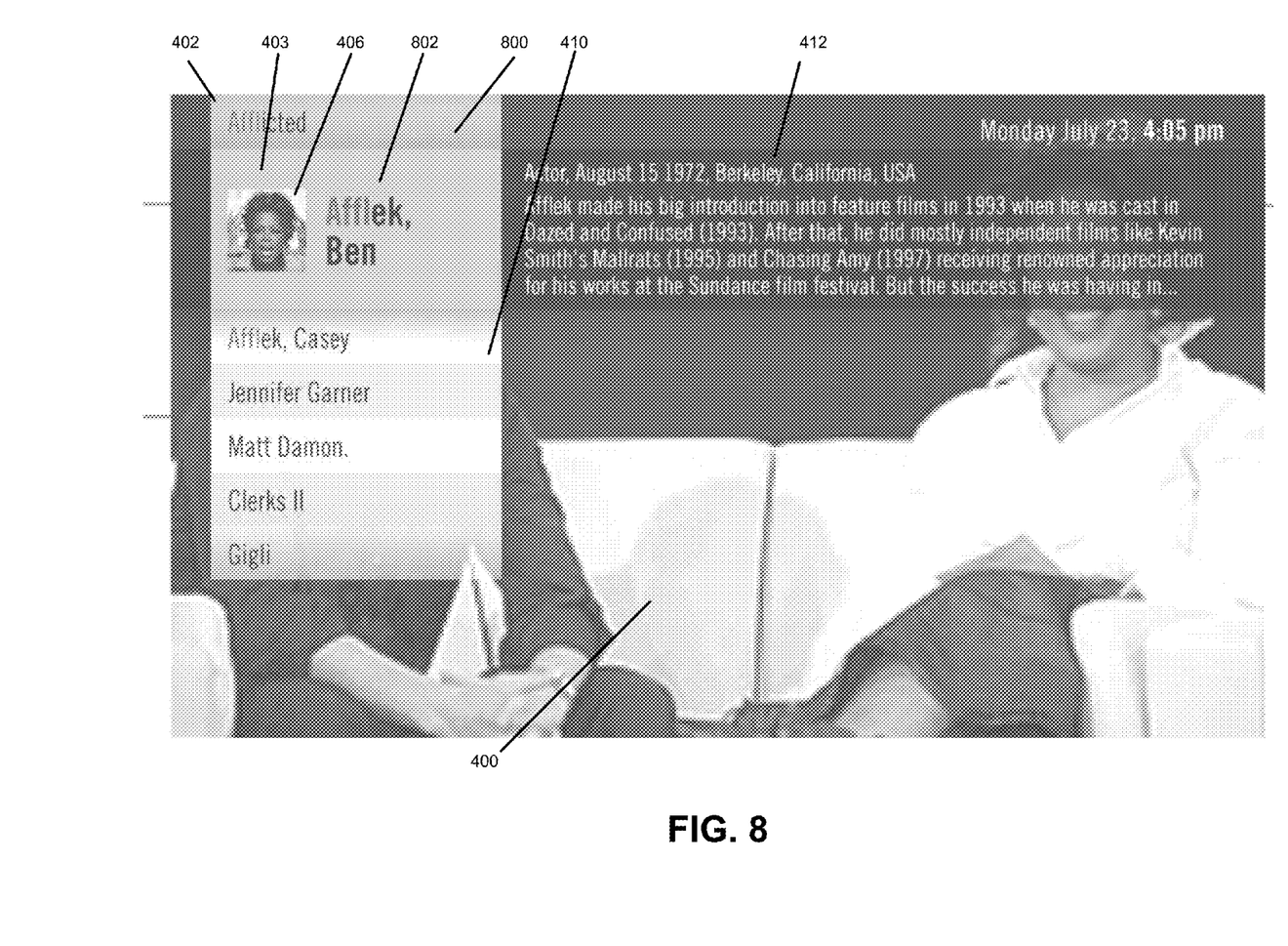

In FIG. 8, the user has used cursor keys 226-232 to scroll down into matches 410, and the location of the cursor is indicated by changing the size of the selected match. The first match, to "Afflicted," is shown as reduced in size as match 800, and the user has scrolled down to match 802, "Affleck, Ben." The channel banner 412 shows information on Ben Affleck in this example.

Another implementation of the present invention can be to show a sub-list of titles in which Ben Affleck is currently appearing when the user scrolls to entry 802. The sub-list could display current programs, then upcoming programs, or, if desired, the sub-list can show only current programs, but pressing a key (for example, the RIGHT cursor key 228) or selecting an onscreen button could allow the user to browse for upcoming programs.

Further, highlighting a list 410 item 800, 802, etc., can show information as is shown in area 412, but pressing the select button 242 on that list 410 item 802 can cause the list below the selected item to swap out for a list that displays all associated programs, sorted by air time/date.

Figure 9:
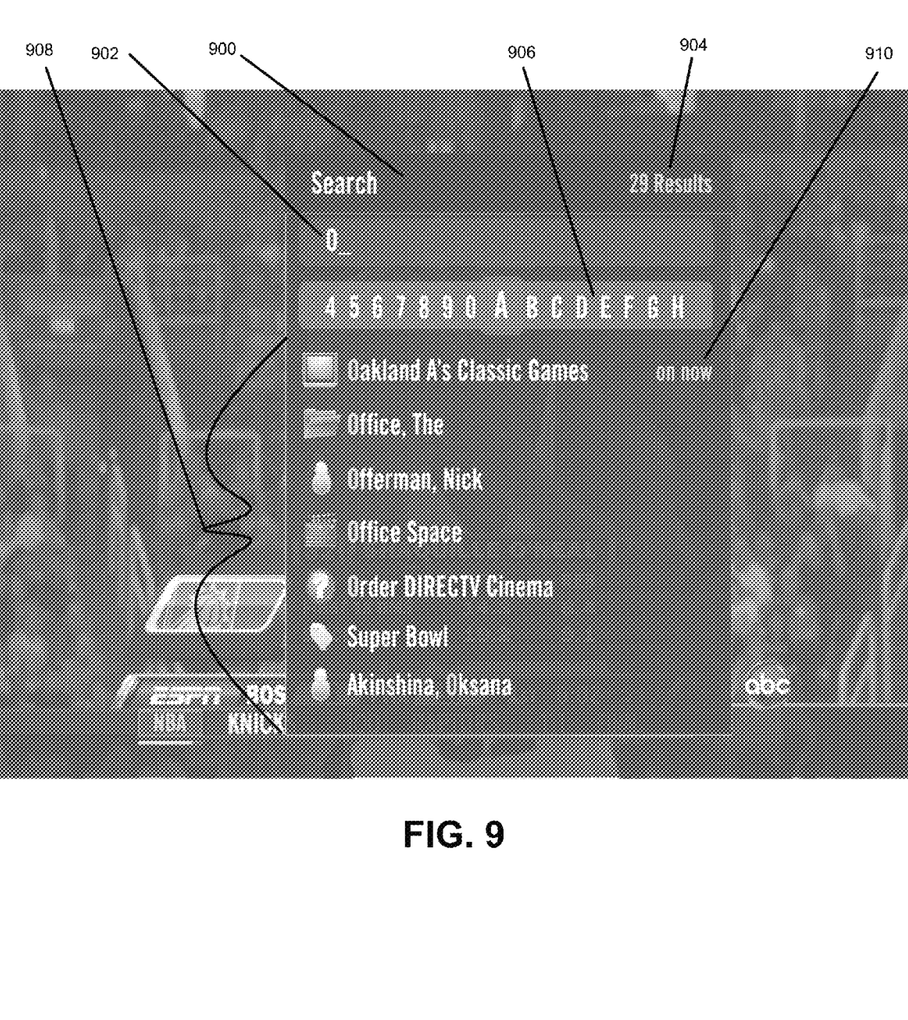
FIG. 9 illustrates an alternative or cooperative display in accordance with one or more embodiments of the present invention.

FIG. 9 illustrates an alternative or cooperative display in accordance with one or more embodiments of the present invention.

In feature 900, the user has entered an "O" (alphabetic) in the search area 902, and a result number 904 indicates how many programs match the current search term in search area 902. Entry area 906 allows the user to cursor through search terms, rather than enter the numbers from keypad 220, and select a desired search term via the select key 242 or other remote control 224 keys. Matches 908 are shown, and, if desired, an indication of current or future airing time of the matches 908 can be provided as indicator 910. Other implementations and indications, as well as other search strategies, are possible within the scope of the present invention.

Process Chart

Figure 10:
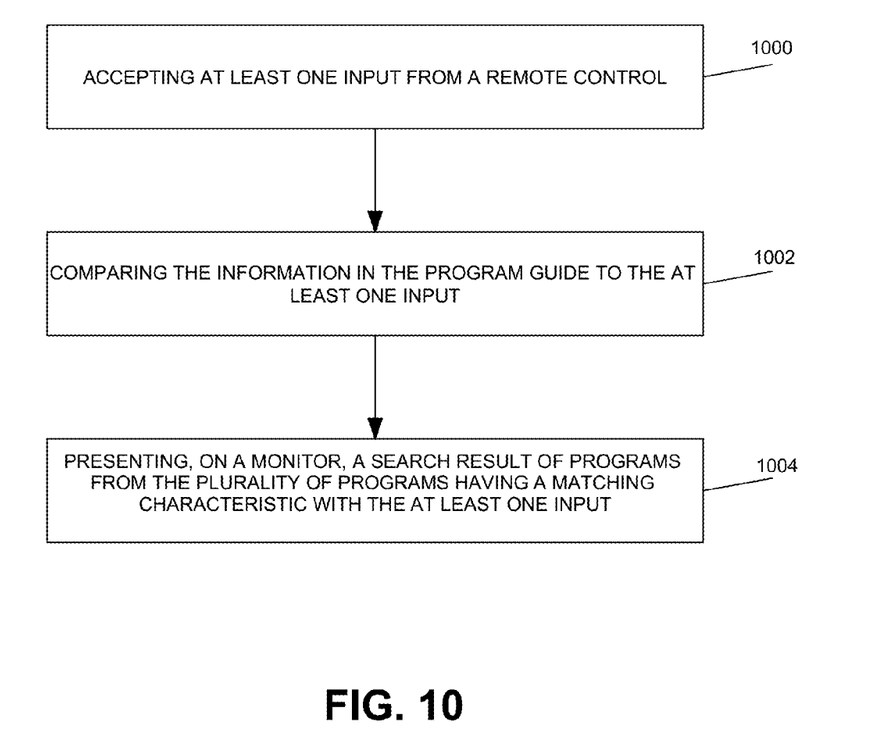
FIG. 10 illustrates process steps used in one or more embodiments of the present invention.

FIG. 10 illustrates process steps used in one or more embodiments of the present invention.

Box 1000 illustrates accepting at least one input from a remote control.

Box 1002 illustrates comparing the information in the program guide to the at least one input.

Box 1004 illustrates presenting, on a monitor, a search result of programs from the plurality of programs having a matching characteristic with the at least one input.

CONCLUSION

The present invention comprises systems, methods, and articles of manufacture for searching available programs in a broadcast system. A system in accordance with one or more embodiments of the present invention comprises a transmitter, transmitting a plurality of video programs and a program guide, the program guide comprising information related to the plurality of video programs, a receiver for receiving the plurality of programs and the program guide from the transmitter, a monitor, coupled to the receiver, for displaying at least a selected one of the plurality of video programs and for selectively displaying the program guide, and a remote control, coupled to the receiver, wherein the receiver accepts at least one input from the remote control, compares the information in the program to the at least one input, and presents a search result of programs from the plurality of programs having a matching characteristic with the at least one input.

Such a system further optionally comprises the at least one input being a numerical input that has a characteristic of at least one alphabetic symbol, the receiver narrowing the search result as additional input from the remote control is accepted, the search result being presented in viewer channel, user-defined, or alphabetical order, the search result comprising at least one sub-list of results, video programs being currently broadcast, and the information comprising at least one of a television show name, a movie name, a producer name, and a person's name.

A method for searching available programs in a broadcast system, the broadcast system comprising a plurality of programs and a program guide including information related to the plurality of video programs, in accordance with one or more embodiments of the present invention comprises accepting at least one input from a remote control, comparing the information in the program guide to the at least one input, and presenting, on a monitor, a search result of programs from the plurality of programs having a matching characteristic with the at least one input. Such a method further optionally comprises the at least one input being a numerical input that has a characteristic of at least one alphabetic symbol, narrowing the search result as additional input from the remote control is accepted, the search result being presented in viewer channel, user-defined, or alphabetical order, the search result comprising at least one sub-list of results, video programs being currently broadcast, and the information comprising at least one of a television show name, a movie name, a producer name, and a person's name.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of searching a program guide, comprising the steps of:
   providing a program for display without program guide information;
   while providing the program for display, accepting a first numerical character input from the user;
   without accepting further user input, identifying program guide data responsive to the first numerical character input and a first alphabetic character associated with the first numerical character input, wherein the identified program data comprises program guide data for a single viewer channel exactly matching only the accepted first numerical channel selection and program guide alphabetic data associated with the first alphabetic character, and
   providing the identified program guide data for the single viewer channel exactly matching only the accepted first numerical channel selection and program guide alphabetic data associated with the first alphabetic character for concurrent display;
   wherein the identified program data is provided in an order matching a sort or filtered preferences selected by the user.

2. The method of claim 1, wherein identifying program guide data responsive to the first numerical character input and a first alphabetic character associated with the first numerical character input comprises:
   searching a database to identify the program guide data responsive to the first numerical character input and a first alphabetic character associated with the first numerical character input; and
   filtering the identified program guide data to exclude program guide data for viewer channels not exactly matching the accepted first numerical character input.

3. The method of claim 2, wherein the first numerical character input consists of a numerical channel selection command from the user.

4. The method of claim 2, further comprising:
   after providing the identified program guide data for display, accepting a second numerical character input from the user;
   without accepting further user command, further identifying program guide data responsive to the first numerical character input, the second numerical character input, the first alphabetic character associated with the first numerical character input and a second alphabetic character associated with the second numerical character input; and
   providing the further identified program guide based upon the further search for display;
   wherein the further program guide data comprises:
      program guide data for the viewer channel exactly matching only the accepted first and second numerical character input; and
      program guide alphabetic data associated with the first and second numerical character input.

5. The method of claim 4, wherein the further identifying program guide data responsive to the first numerical character input, the second numerical character input, the first alphabetic character associated with the first numerical character input and a second alphabetic character associated with the second numerical character input comprises:
   filtering the identified program guide data to exclude program guide data for program guide data not matching the second numerical character input and the second alphabetic character associated with the second numerical character input and to exclude viewer channels not exactly matching the accepted first numerical character input and the second numerical character input.

6. The method of claim 1, wherein the identified program data is provided in viewer channel order.

7. The method of claim 1, further comprising the step of:
   accepting a user selection of an item of the provided program guide data;
   providing a subset of provided program data in a submenu;
   accepting a user selection of a submenu item; and
   providing access to program guide data identified by the selected submenu item.

8. The method of claim 1, further comprising the step of:
   accepting a user selection of an item of the provided program guide data;
   providing a subset of provided program data in a submenu;
   accepting a user selection of a submenu item; and
   tuning to the program associated with the selected submenu item.

9. An apparatus for searching a program guide, comprising:
   a receiver, configured to provide a program for display without program guide information and to accept a first numerical character input from the user while providing the program for display; and
   wherein the receiver is configured to identify program guide data responsive to the first numerical character input and a first alphabetic character associated with the first numerical character input without accepting further user input and to provide the identified program guide for concurrent display;
   wherein the identified program data comprises program guide data for the single viewer channel exactly matching only the accepted first numerical channel selection and program guide alphabetic data associated with the first alphabetic character, and wherein the identified program data is provided in an order matching a sort or filtered preferences selected by the user.

10. The apparatus of claim 9, wherein the receiver identifies program guide data responsive to the first numerical character input and a first alphabetic character associated with the first numerical character input by searching a database to identify the program guide data responsive to the first numerical character input and a first alphabetic character associated with the first numerical character input, and filtering the identified program guide data to exclude program guide data for viewer channels not exactly matching the accepted first numerical character input.

11. The apparatus of claim 10, wherein the first numerical character input consists of a numerical channel selection command from the user.

12. The apparatus of claim 10, wherein the receiver is further configured to:
accept a second numerical character input from the user after providing the identified program guide data for display,
further identify program guide data responsive to the first numerical character input, the second numerical character input without accepting further user command, wherein the first alphabetic character is associated with the first numerical character input and a second alphabetic character associated is with the second numerical character input; and
provide the further identified program guide based upon the further search for display;
wherein the further program guide data comprises:
program guide data for the viewer channel exactly matching only the accepted first and second numerical character input;
program guide alphabetic data associated with the first and second numerical character input.

13. The apparatus of claim 12, wherein the receiver further identifies program guide data responsive to the first numerical character input, the second numerical character input, the first alphabetic character associated with the first numerical character input and a second alphabetic character associated with the second numerical character input by filtering the identified program guide data to exclude program guide data for program guide data not matching the second numerical character input and the second alphabetic character associated with the second numerical character input and to exclude viewer channels not exactly matching the accepted first numerical character input and the second numerical character input.

14. The apparatus of claim 9, wherein the identified program data is provided in viewer channel order.

15. The apparatus of claim 9, wherein the receiver is further configured to:
accept a user selection of an item of the provided program guide data;
provide a subset of provided program data in a submenu;
accept a user selection of a submenu item; and
provide access to program guide data identified by the selected submenu item.

16. The apparatus of claim 9, wherein the receiver is further configured to:
accept a user selection of an item of the provided program guide data;
provide a subset of provided program data in a submenu;
accept a user selection of a submenu item; and
tune to the program associated with the selected submenu item.

17. A method of searching a program guide having program guide data, comprising the steps of:
providing a program for display without the program guide data;
while providing the program for display, accepting a first numerical character input from the user;
without accepting further user input, providing a first portion of the program guide data for display concurrent with the program;
wherein:
the provided first portion of the program guide data includes program guide data for a viewer channel exactly matching the accepted first numerical character input and includes program guide data associated with one or more first alphabetic characters associated with the first numerical character input; and
the provided first portion of the program guide data excludes program guide data for a viewer channel not exactly matching the accepted first numerical character input and excludes program data not associated with the one or more first alphabetic characters associated with the first numerical character input.

18. The method of claim 17, wherein the provided first portion of the program guide data is identified by performing steps comprising:
searching a database to identify the program guide data responsive to the first numerical character input and the one or more first alphabetic characters associated with the first numerical character input; and
filtering the identified program guide data to exclude program guide data for viewer channels not exactly matching the accepted first numerical character input.

19. The method of claim 18, wherein the first numerical character input consists of a numerical channel selection command from the user.

20. The method of claim 18, further comprising:
after providing the first portion of the program guide data for display, accepting a second numerical character input from the user;
without accepting further user command, providing a second portion of the program data in place of the first portion of the program data for display concurrent with the program;
wherein:
the second portion of the program guide data includes program data for a second viewer channel exactly matching a combined accepted first numerical character input and accepted second numerical character input, and includes program guide data associated with the one or more first alphabetic characters associated with the first numerical character input combined with one or more second alphabetic characters associated with the second numerical character input; and
the second portion of the program guide data excludes program data for a second viewer channel not exactly matching a combined accepted first numerical character input and accepted second numerical character input, and excludes program guide data associated with the one or more first alphabetic characters associated with the first numerical character input combined with one or more second alphabetic characters associated with the second numerical character input.

21. The method of claim 17, wherein the first portion of the program data is provided in viewer channel order.

22. The method of claim 17, further comprising the step of:
accepting a user selection of an item of the provided first portion of the program guide data;
providing a subset of provided first portion of the program guide data in a submenu;
accepting a user selection of a submenu item; and
providing access to program guide data identified by the selected submenu item.

23. The method of claim 17, further comprising the step of:
accepting a user selection of an item of the provided first portion of the program guide data;
providing a subset of provided first portion of the program data in a submenu;
accepting a user selection of a submenu item; and
tuning to the program associated with the selected submenu item.

24. An apparatus for searching a program guide having program guide data, comprising:
a receiver, configured to provide a program for display without the program guide data and to accept a first numerical character input from the user while providing the program for display; and
wherein the receiver is configured to provide, without accepting further user input a first portion of the program guide data for display concurrent with the program;
wherein:
the provided first portion of the program guide data includes program guide data for a viewer channel exactly matching the accepted first numerical character input and includes program guide data associated with one or more first alphabetic characters associated with the first numerical character input; and
the provided first portion of the program guide data excludes program guide data for a viewer channel not exactly matching the accepted first numerical character input and excludes program data not associated with the one or more first alphabetic characters associated with the first numerical character input.

25. The apparatus of claim 24, wherein the provided first portion of the program guide data is identified by searching a database to identify the program guide data responsive to the first numerical character input and the one or more first alphabetic character associated with the first numerical character input, and filtering the identified program guide data to exclude program guide data for viewer channels not exactly matching the accepted first numerical character input.

26. The apparatus of claim 25, wherein the first numerical character input consists of a numerical channel selection command from the user.

27. The apparatus of claim 25, wherein the receiver is further configured to:
accept a second numerical character input from the user after providing the first portion of the program guide data for display;
without accepting further user command, provide a second portion of the program data in place of the first portion of the program data for display concurrent with the program:
wherein:
the second portion of the program guide data includes program data for a second viewer channel exactly matching a combined accepted first numerical character input and accepted second numerical character input, and includes program guide data associated with the one or more first alphabetic characters associated with the first numerical character input combined with one or more second alphabetic characters associated with the second numerical character input; and
the second portion of the program guide data excludes program data for a second viewer channel not exactly matching a combined accepted first numerical character input and accepted second numerical character input and excludes program guide data associated with the one or more first alphabetic characters associated with the first numerical character input combined with one or more second alphabetic characters associated with the second numerical character input.

28. The apparatus of claim 24, wherein the first portion of the program data is provided in viewer channel order.

29. The apparatus of claim 24, wherein the receiver is further configured to:
accept a user selection of an item of the provided first portion of the program guide data;
provide a subset of provided first portion of the program guide data in a submenu;
accept a user selection of a submenu item; and
provide access to program guide data identified by the selected submenu item.

30. The apparatus of claim 24, wherein the receiver is further configured to:
accept a user selection of an item of the provided first portion of the program guide data;
provide a subset of provided first portion of the program guide data in a submenu;
accept a user selection of a submenu item; and
tune to the program associated with the selected submenu item.

* * * * *